United States Patent [19]

Kojima et al.

[11] Patent Number: 5,797,668
[45] Date of Patent: Aug. 25, 1998

[54] SURFACE ILLUMINATION DEVICE SUITABLE FOR A BACKLIT DISPLAY

[75] Inventors: Hiroshi Kojima; Nobuo Naito, both of Tokyo-To, Japan

[73] Assignee: Dai Nippon Printing Co., Ltd., Tokyo-To, Japan

[21] Appl. No.: 832,047

[22] Filed: Apr. 2, 1997

[30] Foreign Application Priority Data

Apr. 4, 1996 [JP] Japan ................... 8-106480

[51] Int. Cl.$^6$ .................. F21V 5/00; F21V 5/04; F21V 7/04
[52] U.S. Cl. .................. 362/31; 362/26; 362/308; 362/330; 362/339; 349/57; 349/61
[58] Field of Search ............... 362/31, 26, 330, 362/339, 308; 349/57, 61, 65

[56] References Cited

U.S. PATENT DOCUMENTS

| | | |
|---|---|---|
| 4,257,084 | 3/1981 | Reynolds ................... 362/31 |
| 4,737,896 | 4/1988 | Mochizuki et al. ............ 362/301 |
| 5,193,899 | 3/1993 | Oe et al. .................... 362/224 |
| 5,394,255 | 2/1995 | Yokota et al. ............... 359/49 |
| 5,408,388 | 4/1995 | Kobayashi et al. ........... 362/31 |
| 5,442,523 | 8/1995 | Kashima et al. ............. 362/31 |
| 5,467,417 | 11/1995 | Nakamura et al. ........... 385/36 |
| 5,572,411 | 11/1996 | Watai et al. ................ 362/31 |
| 5,598,280 | 1/1997 | Nishio et al. ............... 349/57 |
| 5,671,028 | 9/1997 | Okano ...................... 349/66 |
| 5,718,497 | 2/1998 | Yokoyama et al. ........... 362/31 |

FOREIGN PATENT DOCUMENTS

| | | |
|---|---|---|
| 5-169015 | 7/1993 | Japan . |
| 6-95108 | 4/1994 | Japan ................... 362/339 |

*Primary Examiner*—Ira S. Lazarus
*Assistant Examiner*—Ljiljana V. Ciric
*Attorney, Agent, or Firm*—Morgan & Finnegan, LLP

[57] ABSTRACT

A lens film provided in front of a light guide plate of a surface illuminant device comprises a base film, and a plurality of triangular parallel prisms formed in a two-dimensional arrangement on one surface of the base film integrally with the latter to form an exit surface. Each prism has a cross section of the shape of a isosceles triangle. The shape of the triangular prisms meets conditions represented by:

$$R = \frac{|\sin^{-1}\{n \cdot \sin\{\cos^{-1}(1/n \cdot \cos(\theta_2/2)) - \theta_2/2\}|}{\theta_1}$$

$0.5 \leq R \leq 1.0$ where $\theta_1$ is a peak exit angle at which a direction, in which most part of light leaving an exit surface of a light guide plate toward the lens film travels, is inclined to a normal to an entrance surface of the lens film, $\theta_2$ is an apex angle of the triangular prisms, and n is refractive index of the lens film. The lens film deflects incoming light so that most part of the light leaving the lens film travels in a direction substantially parallel to a normal to its imaginary exit surface, and serves to increase the head-on luminance.

5 Claims, 3 Drawing Sheets

SURFACE ILLUMINATION DEVICE SUITABLE FOR A BACKLIT DISPLAY

BACKGROUND OF THE INVENTION

1. Field of the Invention

The present invention relates to a surface illuminant device used as a backlight for a transmission liquid crystal display, an advertisement board, and so on. More particularly, the present invention relates to a surface illuminant device which are capable of using light efficiently.

2. Description of the Related Art

An edge-lit type surface illuminant device which can be formed in a small, thin construction has been used as a backlight for a transmission display, such as a liquid crystal display. Such a conventional surface illuminant device comprises, as principal components, a foremost lens film, a light guide plate disposed behind the lens film, a light source disposed along a side edge of the light guide plate, a light diffusing film interposed between the lens film and the light guide plate, and a light reflecting member, such as a light reflecting film, disposed behind the light guide plate. White dots are formed by printing directly on the back surface of the light guide plate or on the light reflecting member on the side of the back surface of the light guide plate so that the density of the white dots increases with the distance from that side edge of the light guide plate adjacent the light source to correct the reduction of the distribution of quantity of light emitted from the light guide plate with the distance from the light source. The lens film is provided with a plurality of triangular prisms in a two-dimensional parallel arrangement.

In this conventional surface illuminant device, the light guide plate is formed so that light received through one side edge surface thereof is emitted uniformly through its exit surface, i.e., its front surface, and the lens film is formed so that light received directly or through the light diffusing plate from the light guide plate is directed in a direction in which the lens film is viewed from the front side. Although the performance of the conventional surface illuminant device is satisfactory to some extent, the combination of the lens film and the light guide plate is not necessarily an optimum combination determined on the basis of thorough estimation of changes in the traveling direction of light rays caused by the lens film and the light guide plate, and the surface illuminant device is not necessarily capable of using light efficiently.

SUMMARY OF THE INVENTION

It is an object of the present invention to provide a surface illuminant device that enables a most efficient use of light emitted from the light source.

According to the present invention, a surface illuminant device comprises a light guide plate for emitting light therefrom through an exit surface, and a lens film disposed facing the exit surface. The lens film is provided with a plurality of triangular prisms of a cross section having the shape of an isosceles triangle in one surface thereof serving as an exit surface. The triangular prisms meet conditions expressed by:

$$R = \frac{|\sin^{-1}|n \cdot \sin\{\cos^{-1}(1/n \cdot \cos(\theta_2/2)) - \theta_2/2\}|}{\theta_1}$$

$$0.5 \leq R \leq 1.0$$

where $\theta_1$ is a peak exit angle at which a direction, in which most light rays outgoing from the exit surface of the light guide plate toward the entrance surface of the lens film travel, is inclined to a normal to an entrance surface of the lens film, $\theta_2$ is an apex angle of the triangular prisms of the lens film, and n is the refractive index of the lens film. The lens film is designed so as to deflect the largest possible quantity of light falling on the back surface thereof at an angle to the back surface among all the light falling on the back surface, mainly in a direction parallel to a normal to the exit surface of the lens film. The peak exit angle $\theta_1$ of light rays outgoing from the exit surface of the light guide plate with respect to a normal to the exit surface of the lens film may be considered to be equal to the peak entrance angle $\theta_1$ of light rays falling on the lens film.

Accordingly, a surface illuminant device provided with a light guide plate and a lens film closely related with each other to meet the foregoing conditions represented by the foregoing expressions is capable of directing most light rays in a direction parallel to a normal to the exit surface of the lens film, i.e., the exit surface of the surface illuminant device, for efficient utilization of light.

The above and other objects, features and advantages of the present invention will become more apparent from the following description taken in connection with the accompanying drawings.

DESCRIPTION OF THE PREFERRED EMBODIMENT

Figure 3:
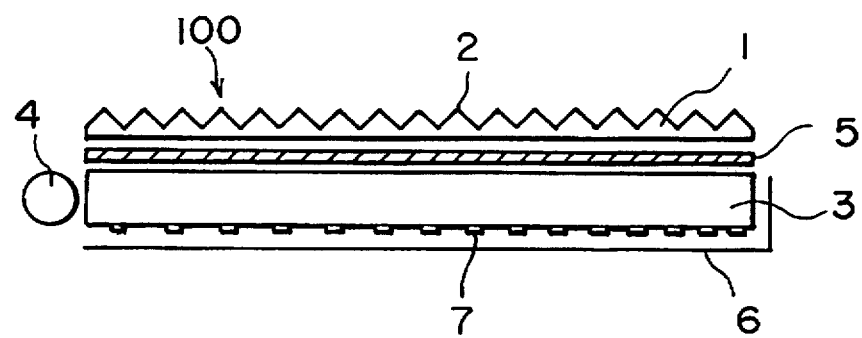
FIG. 3 is a sectional view of a surface illuminant device in a preferred embodiment according to the present invention.

Referring to FIG. 3, an embodiment of the surface illuminant device 100 according to the present invention has a foremost lens film 1, a light conduction or guide plate 3 of uniform thickness provided behind the lens film 1, a linear light source 4 disposed along a side edge of the light guide plate 3, a light diffusing film 5, and a light reflecting member 6 disposed behind the light guide plate 3. The light diffusing film 5 is interposed between the lens film 1 and the light guide plate 3. The light reflecting member 6 may be composed of a film. Minute white dots 7 are formed by printing directly on the back surface of the light guide plate 3 or on the light reflecting member 6 such that the density of the white dots 7 increases with the distance from that side edge of the light guide plate 3 adjacent the light source 4 to correct the reduction of the distribution of quantity of light emitted from the light guide plate 3 with the distance from the light source 4. The lens film 1 is formed with parallel triangular prisms 2 on the front surface thereof.

As is well known in the art, light emitted from the light source 4 is reflected internally in the light guide plate 3 and directed forward through the light diffusing plate 5 and foremost lens film 1. The light reflecting member 6 and the white dots 7 serve for effective reflection of the light emitted from the light source 4.

Figure 1:
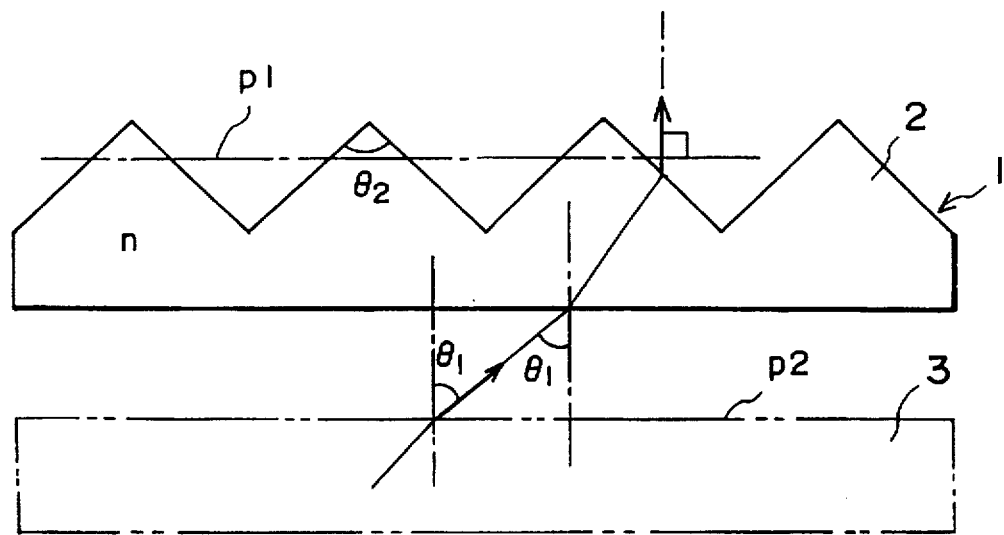
FIG. 1 is a typical sectional view of a lens film used in the surface illuminant device according to the present invention.

Referring to FIG. 1 showing the lens film 1 on an enlarged scale, the lens film 1 is designed, according to the present invention, to make the surface illuminant device 100 employing the lens film 1 look most bright when viewed head on or perpendicularly to the lens film 1 from the center of the film 1. This means that most light rays traveled through the lens film 1 leave the lens film 1 in a direction parallel to or directions substantially parallel to a normal to an imaginary exit surface p1 of the lens film 1. The lens film 1 is provided with a plurality of the triangular prisms 2 of a cross section having the shape of an isosceles triangle. A ridged surface formed of the triangular prisms 2 is an actual exit surface 1a of the lens film 1. The imaginary exit surface p1 of the lens film 1 to which a normal to "the exit surface" of the lens film 1 is perpendicular is a plane parallel to the entrance surface 1b of the lens film 1. A peak exit angle $\theta_1$ is an angle at which a direction in which most light rays outgoing from the exit surface p2 of the light guide plate 3 toward the entrance surface 1b of the lens film 1 travel is inclined to a normal to the exit surface p2 of the light guide plate 3. The peak exit angle $\theta_1$ is equal to a peak entrance angle at which the direction in which light rays fall on the entrance surface 1b of the lens film 1 is inclined to a normal to the entrance surface 1b.

According to the present invention, the lens film 1 and the light guide plate 3 are designed so as to meet conditions expressed by:

$$R = \frac{[\sin^{-1}\{n \cdot \sin\{\cos^{-1}(1/n \cdot \cos(\theta_2/2)) - \theta_2/2\}]]}{\theta_1} \quad (1)$$

$$0.5 \leq R \leq 1.0$$

where $\theta_1$ is peak exit angle, $\theta_2$ is the apex angle of the triangular prisms 2 of the lens film 1, and n is the refractive index of the lens film 1. Light rays outgoing from the light guide plate 3 in a direction at the peak exit angle $\theta_1$ to a normal to the exit surface p2 of the light guide plate 3 emanate from the actual exit surface 1a of the lens film 1 in a direction parallel to a normal to the imaginary exit surface p1 of the lens film 1.

The lens film 1 may be provided with triangular prisms 2 respectively having different apex angles instead of the triangular prisms 2 having the same apex angle $\theta_2$ to make light rays emanating at different peak exit angles from different portions of the exit surface p2 of the light guide plate 3 respectively at different distances from a light source and entering the lens film 1 at different entrance angles emanate in parallel to the normal to the imaginary exit surface p1 of the lens film 1.

Figure 2:
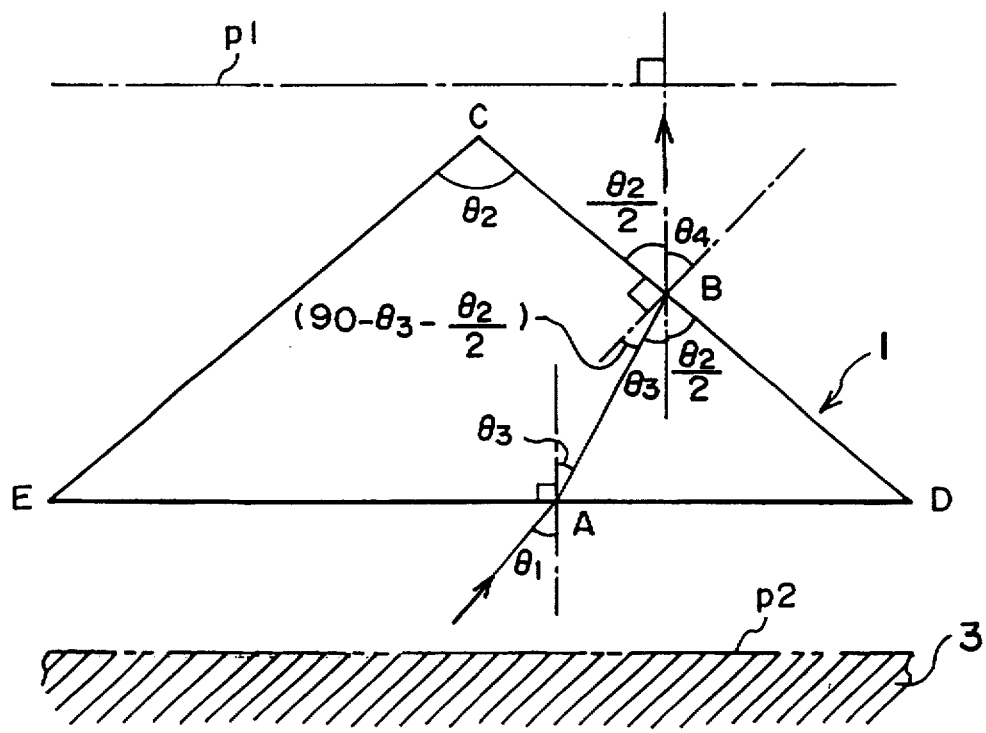
FIG. 2 is a diagrammatic view of assistance in explaining a desirable shape of triangular prisms of the lens film of FIG. 1.

The significance of the condition (1) will be described hereinafter. FIG. 2 shows one of the triangular prisms 2 of the lens film 1 in a sectional view, indicating the relation of the peak exit angle $\theta_1$, the apex angle $\theta_2$ and the refractive index n when R =1. As shown in FIG. 2, the imaginary exit surface p1 of the lens film 1 is parallel to the exit surface p2 of the light guide plate 3, the lens film 1 is disposed close to the light guide plate 3 and, in some cases, a light diffusing film is interposed between the lens film 1 and the light guide plate 3. The peak entrance angle, i.e., the angle of a direction in which most light rays travel toward the entrance surface 1b of the lens film 1, to a normal to the imaginary exit surface p1 of the lens film, is approximately equal to the peak exit angle to a normal to the exit surface p2 of the light guide plate 3 and equal to the peak exit angle with respect to a normal to the exit surface p2 of the light guide plate 3.

As shown in FIG. 2, light rays fall obliquely from the left side to the right side on the back surface 1b, i.e., the entrance surface, of the lens film 1 and hence a light source is on the left side of the light guide plate 3. The entrance surface 1b of the lens film 1 is parallel to the imaginary exit surface p1 of the lens film 1. A light ray falling at a point A on the entrance surface 1b of the lens film 1 at an incidence angle $\theta_1$, which is equal to the peak exit angle $\theta_1$, travels through the lens film 1 in a direction at an angle $\theta_3$ to a normal to the entrance surface 1b of the lens film 1, and leaves the lens film 1 at a point B on a slope CD of the triangular prism 2. When it is desired to make all the light rays emanating from the lens film 1 travel in a direction parallel to a normal to the imaginary exit surface p1, the angle $\theta_4$ of the direction in which the light rays travel to a normal to the slope CD is expressed as a function of the apex angle $\theta_2$ of the triangular prisms 2 by Expression (2).

$$\theta_4 = 90 - \theta_2/2 \quad (2)$$

Expression (3) is formed for the entrance surface, according to Snell's law.

$$1 \cdot \sin \theta_1 = n \cdot \sin \theta_3 \quad (3)$$

Expression (4) is formed for the slope CD on the basis of Expression (2).

$$n \cdot \sin (90 - \theta_3 - \theta_2/2) = 1 \cdot \sin (90 - \theta_2/2) \quad (4)$$

Expression (5) is obtained from Expression (4).

$$n \cdot \cos (\theta_3 + \theta_2/2) = 1 \cdot \cos (\theta_2/2) \quad (5)$$

Expression (5) can be rewritten into Expression (6).

$$\theta_3 + \theta_2/2 = \cos^{-1} (1/n \cdot \cos (\theta_2/2)) \quad (6)$$

Expression (7) representing the relation between angles $\theta_3$ and $\theta_2$ is obtained from Expressions (5) and (6).

$$\theta_3 = \cos^{-1} (1/n \cdot \cos (\theta_2/2)) - \theta_2/2 \quad (7)$$

Expression (8) is obtained by substituting Expression (7) into Expression (3), and the angle $\theta_1$ is expressed by Expression (9). R is expressed by Expression (10).

$$\sin \theta_1 = n \cdot \sin \{\cos^{-1} (1/n \cdot \cos (\theta_2/2)) - \theta_2/2\} \quad (8)$$

$$\theta_1 = \sin^{-1} [n \cdot \sin \{\cos^{-1} (1/n \cdot \cos (\theta_2/2)) - \theta_2/2 \}] \quad (9)$$

$$R = \frac{[\sin^{-1}[n \cdot \sin\{\cos^{-1}(1/n \cdot \cos(\theta_2/2)) - \theta_2/2\}]]}{\theta_1} \quad (10)$$

When R=1.0, light rays leaving the exit surface p2 of the light guide plate 3 at the peak exit angle $\theta_1$ emanate from the lens film 1 in parallel to the normal to the imaginary exit surface p1 of the lens film 1. All the light rays outgoing from the exit surface of the light guide plate 3 do not necessarily leave the exit surface at the peak exit angle $\theta_1$. Therefore, R need not be limited to 1.0, because the lens film 1 is able to deflect light rays so as to emanate from the exit surface of the lens film 1 in directions substantially parallel to a normal to the imaginary exit surface p1 of the lens film 1 even if the lens film 1 is provided with the triangular prisms 2 having the same apex angle $\theta_2$, provided that light rays falling on the entrance surface 1b of the lens film 1 leave the light guide plate 3 at exit angles in a certain angular range. It has been found desirable that R is in the range of 0.5 to 1.0. If R is outside the range of 0.5 to 1.0, the quantity of light that leaves the exit surface of the lens film 1 in a direction parallel to the normal to the imaginary exit surface p1 of the lens surface 1 decreases and the head-on luminance of the lens film 1 is reduced.

Figure 4:
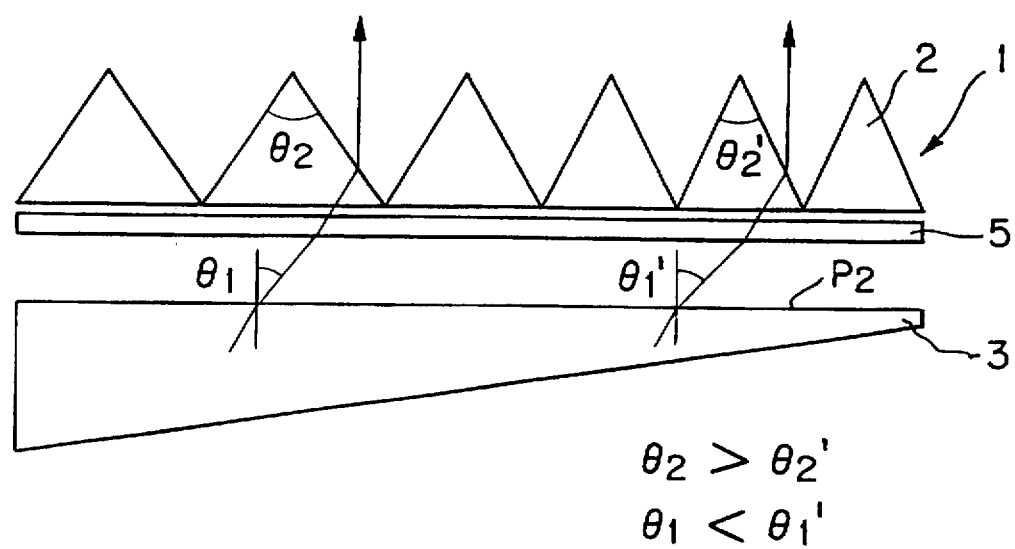
FIG. 4 is a sectional view of a surface illuminant device in another preferred embodiment, according to the present invention.

Although all the triangular prisms 2 of the lens film 1 in this embodiment has the same apex angle $\theta_2$, the apex angle of all the triangular prisms 2 need not necessarily be the same. If light rays leave different portions of the exit surface of the light guide plate 3 at different exit angles, respectively, the triangular prisms 2 at different portions of the lens film 1 may have different apex angles corresponding to the different exit angles, respectively, as shown in FIG. 4, so that light rays leave the exit surface of the lens film 1 at the same exit angle.

If the light guide plate 3 employed in combination with the lens film 1 in a surface illuminant device is a simple flat plate having uniform thickness, the quantity of light emanating from a portion of the light guide plate 3 farther from a light source is smaller than that of light emanating from a portion of the light guide plate 3 nearer to the light source. White dots 7 may be formed by printing or the like on the back surface of the light guide plate 3 so that the density of the white dots in a portion of the back surface farther from the light source is greater than that of the white dots in a portion of the back surface nearer to the light source.

Alternatively the light guide plate 3 may be formed in the shape of a wedge having its thickness decreasing with distance from the light source to make uniform the distribution of quantity of light emanating from the exit surface of the light guide plate 3. If the light guide plate 3 is formed in the shape of a wedge, the peak exit angle of light outgoing from the light guide plate 3 increases slightly with distance from the light source. When the lens film 1 is used in combination with such a light guide plate having the shape of a wedge, the respective apex angles of the triangular prisms 2 at different distances from the light source may be varied with distances from the light source according to the variation of the thickness of the light guide plate with distance from the light source to make light rays emanating from different portions of the exit surface of the lens film 1 travel in substantially the same direction.

Consequently, difference in maximum luminance in a specific direction between portions of the light emitting surface of the surface illuminant device can be reduced. Even if different portions of the exit surface of the light guide plate 3 have somewhat different peak exit angles, respectively, the apex angle of the triangular prisms 2 of the lens film 1 may be determined on the basis of a representative peak exit angle among those different peak exit angles, and the surface illuminant device may be provided with a lens film provided with such triangular prisms.

According to the present invention R meets an inequality: $0.5 \leq R \leq 1.0$, which, however, does not mean that R is set intentionally at a value other than 1.0, for example, 0.6 and then the apex angles of all the triangular prisms 2 of the lens film 1 is determined accordingly. If R is set intentionally at a specific value, then light emanating from the exit surface of the lens film 1 may travel in a specific direction other than a direction normal to the imaginary exit surface of the lens film 1. Essentially, R is 1.0 and R may not be 1.0 in some portions of the lens film 1 due to difference in peak exit angle and refractive index of the same portions of the lens film 1 from those of other portions of the lens film 1. At any rate the lens film 1 is able to emit light most efficiently in a direction normal to the imaginary exit surface thereof when $0.5 \leq R \leq 1.0$. It is a basic idea in the present invention to fix R to a constant value and to determine the apex angle $\theta_2$ of each of the triangular prisms 2 according to the peak exit angle $\theta 1$ of light outcoming from a corresponding portion of the exit surface of the light guide plate 3.

Table 1 shows typical corresponding values of the refractive index n of the lens film 1 and the apex angle $\theta_2$ of the triangular prisms 2 for a peak exit angle $\theta_1$ of 28° to emit light in a direction parallel to a normal to the imaginary exit surface of the lens film 1.

TABLE 1

| Refractive index n | 1.4 | 1.5 | 1.6 | 1.7 | 1.8 | 1.9 |
|---|---|---|---|---|---|---|
| Apex angle $\theta_2$ (°) | 68.4 | 84.3 | 96.9 | 107.0 | 115.1 | 121.7 |
| Refractive index n | 2.0 | 2.1 | 2.2 | 2.3 | 2.4 | 2.5 |
| Apex angle $\theta_2$ (°) | 127.1 | 131.7 | 135.6 | 138.9 | 141.7 | 144.2 |
| Refractive index n | 2.6 | 2.7 | 2.8 | 2.9 | 3.0 | |
| Apex angle $\theta_2$ (°) | 146.4 | 148.4 | 150.1 | 151.7 | 153.1 | |

Note: Peak exit angle $\theta_1 = 28°$

The lens film 1 may be formed of a transparent resin, such as an acrylic resin or a polycarbonate resin, by injection molding. The lens film 1 may be composed of a base film of a transparent resin, such as a polyethylene terephthalate resin, and a surface layer of a transparent ionizing-radiation-setting resin, such as an acrylate resin, having the shape of the triangular prisms. The lens film 1 may be manufactured by, for example, a manufacturing method disclosed in JP-A No. 5-169015, which fills up recesses having shapes complementary to the triangular prisms 2 and engraved in the surface of an intaglio roll, with an ionizing-radiation-setting resin, a base film is wound round the intaglio roll, the resin filling up the recesses is irradiated with ultraviolet rays for setting so that the resin filling up the recess is set to form the triangular prisms and joined to the base film, and then removes the base film to which the triangular prisms are joined from the intaglio roll.

As shown in FIG. 3, the lens film 1, the light guide plate 3 underlying the lens film 1, and the light source 4 disposed close to one side edge of the light guide plate 3 are essential components of the surface illuminant device. Those components of the surface illuminant device may be known members employed in the conventional surface illuminant device of an edge light system. For example, the light guide plate 3 is made of a transparent resin, such as an acrylic resin, the light source 4 is a linear light source such as a cold-cathode tube, the light diffusing film 5 is an opaline resin film, and the reflecting member 6 is a white foam resin film or a resin film coated with a metal film formed by vacuum deposition. The light guide plate 3 may be a flat plate having uniform thickness or may be a wedge shaped plate, in cross section, tapering away from the light source 4, as shown in FIG. 4. The exit surface of the light guide plate 3 may be finished by a surface roughening process and the light diffusing film 5 may be omitted. Two light sources may be disposed close to the opposite sides of the rectangular light guide plate 3, respectively. When two light sources are disposed close to the opposite sides of the rectangular light guide plate 3, respectively, the light guide plate has two sections symmetrical with respect to a center line and having peak exit angles of equal absolute values and of different signs, respectively. Since the triangular prisms 2 of the lens film 1 has a cross section in the shape of a isosceles triangle, the lens film is able to deflect effectively light rays emitted by the light sources disposed on the opposite sides of the light guide plate 3 so that the light rays leaving the lens film 1 travel in a direction parallel or substantially parallel to a normal to the imaginary exit surface of the lens film 1.

Examples of the surface illuminant device of present invention and comparative examples will be described below.

EXAMPLES

A flat, rectangular transparent acrylic resin plate (SUMIPEC E, Sumitomo Chemical Co., Ltd., Japan) of 4 mm in thickness having an exit surface of 165 mm×220 mm and provided on its back surface with white dots formed by printing was used as the light guide plate. A linear cold-cathode tube (12 V, 0.43 A, 5.16 W) was employed as the light source and was disposed close to one side surface of 200 mm in length of the light guide plate. A white foam film was disposed as the reflecting member on the back surface of the light guide plate. An opaline resin film (No. 7900sc, Dai Nippon Printing Co., Ltd., Japan) was disposed as the light diffusing film on the exit surface of the light guide plate. A lens film provided with a plurality of triangular prisms in a two-dimensional arrangement was placed on the light diffusing film with the triangular prisms extended in parallel to the linear light source and the surface provided with the triangular prisms facing outside. The peak exit angle of light leaving the light guide plate was 28°.

Lens films were fabricated by forming triangular prisms of a UV-setting resin (Z-9002A, Japan Synthetic Rubber Co., Ltd.) having different dimensions on 125 μm thick transparent polyethylene terephthalate films (A-4300, Toyobo Co., Ltd.), respectively, by the foregoing manufacturing method disclosed in JP-A NO. 5-160915. The triangular prisms used were in the range of about 9 to about 25 μm in height, and about 50 μm in the length of the base. Table 2 shows the apex angles $\theta_2$, the refractive indices n of the lens films, exit angles $\theta_4$ of directions of light rays leaving the lens films to normals to the imaginary exit surfaces of the lens films, head-on luminances of the surface illuminant devices measured with a luminance meter (BM-7, K. K. Topcon), and half-widths. The peak exit angle $\theta_1$ is 28° in these examples. A half-width is defined as follows. The luminance is the largest in a direction in which the largest number of light rays are emitted. The luminance decreases in directions farther from that direction and drops to a half value. Half-width is the value of angular degrees which takes a half value of the largest luminance.

TABLE 2

$\theta_1 = 28°$

| | Apex angle $\theta_2$ (°) | Refractive index n | Exit angle $\theta_4$ (°) | R | Head-on luminance (cd/m$^2$) | Half-width (°) |
| --- | --- | --- | --- | --- | --- | --- |
| Comp.Ex.1 | 140 | 1.49 | 17.6 | 0.36 | 972 | 74(−21 to 53) |
| Comp.Ex.2 | 130 | 1.49 | 15.1 | 0.46 | 1002 | 76(−27 to 49) |
| Ex. 1 | 110 | 1.49 | 9.75 | 0.66 | 1133 | 80(−37 to 43) |
| Ex. 2 | 106 | 1.57 | 5.22 | 0.82 | 1185 | 74(−35 to 39) |
| Ex. 3 | 100 | 1.57 | 2.89 | 0.91 | 1230 | 72(−34 to 38) |
| Ex. 4 | 97 | 1.57 | 1.63 | 0.95 | 1286 | 70(−33 to 37) |
| Ex. 5 | 93.4 | 1.57 | 0.00 | 1.00 | 1315 | 67(−32 to 35) |
| Comp.Ex.3 | 90 | 1.57 | −1.67 | 1.05 | 1304 | 64(−31 to 33) |

TABLE 3

$\theta_1 = 38°$

| | Apex angle $\theta_2$ (°) | Refractive index n | Exit angle $\theta_4$ (°) | R | Head-on luminance (cd/m$^2$) | Half-width (°) |
| --- | --- | --- | --- | --- | --- | --- |
| Comp.Ex.4 | 110 | 1.49 | 19.1 | 0.49 | 958.9 | 80(−37 to 43) |
| Ex. 6 | 106 | 1.57 | 14.8 | 0.61 | 1065 | 74(−35 to 39) |
| Ex. 7 | 97 | 1.57 | 11.8 | 0.70 | 1213 | 70(−33 to 37) |
| Ex. 8 | 90 | 1.57 | 9.13 | 0.77 | 1230 | 68(−33 to 35) |
| Ex. 9 | 85 | 1.57 | 7.04 | 0.83 | 1247 | 64(−31 to 33) |
| Ex. 10 | 80 | 1.57 | 4.71 | 0.89 | 1211 | 61(−30 to 31) |
| Comp.Ex.5 | 66 | 1.55 | −2.06 | 1.04 | 1053 | 62(−31 to 31) |
| Comp.Ex.6 | 63 | 1.52 | −1.18 | 1.02 | 1043 | 58(−29 to 29) |

As will be appreciated from Table 2, the surface illuminant devices in Comparative Examples 1 and 2 have values of R less than 0.5, exit angles $\theta_4$ of more than 15° and low head-on luminances of 972 and 1002 cd/m$^2$, while the surface illuminant devices in Examples 1 to 5 have values of R more than 0.5, exit angles $\theta_4$ of less than 10° and high head-on luminances of more than 1100 cd/m$^2$.

In the surface illuminant device in Comparative Example 3, R is more than 1.0. It will be noted that the head-on luminance decreased relative to that in Example 5 and moreover the half-width also decreased relative to that in Example 5. In Examples 1 to 5, the half-width decreases as the head-on luminance increases as a result of increase of the value of R. This is a natural consequence. However, the tendency is reversed when the value R exceeds 1.00.

The decrease in both the head-on luminance and the half-width means that a value of R exceeding 1.00 is of no practical meaning. For this reason, the range of the value of R in the present invention was determined to be 1.0 at the maximum. On the other hand, a value of R less than 0.5 cannot provide a sufficient value of the head-on luminance and is not practical. Therefore, R is determined to be from 0.5 to 1.0 in the present invention.

Table 3 shows Comparative Examples 4, 5 and 6 and Examples 6 to 9 according to the present invention. It will be noted that in Comparative Example 4 where R is below 0.5, the value of the head-on luminance is low, while in Examples 6 to 10 where R is between 0.5 and 1.0 the head-on luminance is above 1000 cd/m$^2$ which is higher than the head-on luminance in Comparative Example 4.

In Comparative Examples 5 and 6, the value of R is above 1.0. In each of these examples, the head-on luminance value drops relative to the head-on luminance values in Examples 6 to 10. This means that a value of R exceeding 1.0 does not serve to increase the head-on luminance. It will be noted that Table 3 also shows that R should be from 0.5 to 1.0.

As is apparent from the foregoing, the surface illuminant device of the invention is capable of deflecting incoming light rays leaving the exit surface of the light guide plate at the peak exit angle so that the light rays leave the exit surface thereof in a direction parallel or substantially parallel to a normal to the imaginary exit surface thereof. Therefore, the surface illuminant device is capable of emitting most part of light received from the light guide plate in a desired direction and of efficiently using light, and has a high head-on luminance.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A surface illuminant device comprising: a light guide plate for emitting light therefrom through a first light exit surface thereof; and a lens film disposed facing said first light exit surface and including a base film, and a plurality of triangular prisms integrally formed in a two-dimensional arrangement on a surface of the base film remote from said light guide plate to form a second light exit surface, each of said prisms having a cross section in the shape of an isosceles triangle; wherein the shape of the triangular prisms meets conditions expressed by:

$$R = |\sin^{-1} |n \times \sin |\cos^{-1}(1/n \times \cos(\theta_2/2)) - \theta_2/2 | | | / \theta_1$$

$$0.5 \leq R \leq 1.0$$

where $\theta_1$ is a peak exit angle at which a major part of the light leaving said first light exit surface of the light guide plate toward the lens film travels is inclined with respect to a normal to a light entrance surface facing said light guide plate of the lens film, where $\theta_2$ is an apex angle of the triangular prisms, and where n is the refractive index of the lens film; and wherein the triangular prisms at different positions on the surface of the lens film have different apex angles $\theta_2$ corresponding to different peak exit angles $\theta_1$, respectively.

2. The surface illuminant device according to claim 1, wherein said light guide plate has a uniform thickness.

3. The surface illuminant device according to claim 1, wherein said light guide plate is wedge-shaped in cross section.

4. The surface illuminant device according to claim 1, further comprising light diffusing means provided between the light guide plate and the lens film.

5. The surface illuminant device according to claim 1, further comprising a light source disposed along a side edge of the light guide plate for supplying light into the light guide plate.

* * * * *